United States Patent
Nakamura et al.

(10) Patent No.: US 6,817,784 B2
(45) Date of Patent: Nov. 16, 2004

(54) OPTICAL FIBER DEVICE AND METHOD OF MAKING THE SAME

(75) Inventors: Motonori Nakamura, Yokohama (JP); Osamu Kasu, Yokohama (JP); Daisuke Yokota, Yokohama (JP)

(73) Assignee: Sujitomo Electric Industries, Ltd., Osaka (JP)

( * ) Notice: Subject to any disclaimer, the term of this patent is extended or adjusted under 35 U.S.C. 154(b) by 439 days.

(21) Appl. No.: 09/977,348

(22) Filed: Oct. 16, 2001

(65) Prior Publication Data

US 2002/0048437 A1 Apr. 25, 2002

(30) Foreign Application Priority Data

Oct. 20, 2000 (JP) .................................... P2000-321687

(51) Int. Cl.[7] .............................................. G02B 6/255
(52) U.S. Cl. ........................................ 385/95; 385/98
(58) Field of Search ..................................... 385/95–99

(56) References Cited

U.S. PATENT DOCUMENTS

| | | | | |
|---|---|---|---|---|
| 5,732,170 A | * | 3/1998 | Okude et al. ................. | 385/27 |
| 5,802,224 A | * | 9/1998 | Okuta et al. .................. | 385/51 |
| 6,062,743 A | * | 5/2000 | Zheng et al. .................. | 385/95 |
| 6,439,782 B1 | * | 8/2002 | Otani et al. ................... | 385/96 |
| 6,565,269 B2 | * | 5/2003 | Riis et al. ...................... | 385/95 |
| 6,644,870 B2 | * | 11/2003 | Iwata et al. ................... | 385/96 |
| 6,666,591 B2 | * | 12/2003 | Sasaoka et al. ............... | 385/95 |
| 6,705,772 B2 | * | 3/2004 | Nakamura et al. ............ | 385/96 |

FOREIGN PATENT DOCUMENTS

| | | |
|---|---|---|
| JP | 04260007 | 9/1992 |
| JP | 06018726 | 1/1994 |
| JP | 10-300970 | 11/1998 |

* cited by examiner

*Primary Examiner*—Ellen E. Kim
(74) *Attorney, Agent, or Firm*—McDermott Will & Emery LLP

(57) ABSTRACT

The present invention relates to an optical fiber device having a structure for effectively restraining the splice loss from increasing between two kinds of optical fibers having respective mode field diameters different from each other. The optical fiber device comprises first and second optical fibers fusion-spliced to each other, which are partly heat-treated such that both of their respective ratios of change in mode field diameter in the longitudinal direction become a predetermined value or less after fusion-splicing. When the ratios of change in mode field diameter in the vicinity of the fused point are appropriately controlled as such, the increase in splice loss at the fused point between the first and second optical fibers is effectively suppressed.

18 Claims, 11 Drawing Sheets

Fig.4A

| DISTANCE FROM FUSED POINT (mm) | 1st OPTICAL FIBER 10 | | 2nd OPTICAL FIBER 20 | |
|---|---|---|---|---|
| | MFD($\mu$m) | RATIO OF CHANGE | MFD($\mu$m) | RATIO OF CHANGE |
| 0 | 13.1 | | 13.5 | |
| 1 | 11.5 | 1.6 | 13.4 | 0.1 |
| 2 | 11.0 | 0.5 | 13.2 | 0.2 |
| 3 | 8.0 | 3.0 | 12.8 | 0.4 |
| 4 | 4.8 | 3.2 | 11.6 | 1.2 |
| 5 | 4.9 | 0 | 11.7 | 0 |
| 6 | 4.9 | 0 | 11.7 | 0 |

Fig.4B

| DISTANCE FROM FUSED POINT (mm) | 1st OPTICAL FIBER 10 | | 2nd OPTICAL FIBER 20 | |
|---|---|---|---|---|
| | MFD($\mu$m) | RATIO OF CHANGE | MFD($\mu$m) | RATIO OF CHANGE |
| 0 | 13.3 | | 14.3 | |
| 1 | 11.7 | 1.5 | 14.3 | 0 |
| 2 | 6.5 | 5.3 | 13.2 | 1.1 |
| 3 | 5.0 | 1.4 | 11.9 | 1.3 |
| 4 | 5.0 | 0 | 11.6 | 0.3 |
| 5 | 4.9 | 0.1 | 11.7 | 0 |
| 6 | 4.9 | 0 | 11.7 | 0 |

Fig.7

| 1st EMBODI-MENT SAMPLE NO. | D1(0), D2(0) (μm) | 1st OPTICAL FIBER 10 ||||| 2nd OPTICAL FIBER 20 |||||| SPLICE LOSS (dB) |
|---|---|---|---|---|---|---|---|---|---|---|---|---|---|
| | | D1(0) (μm) | D1(2) (μm) | (D1(0)-D1(2))/2 (μm/mm) | D1(3) (μm) | (D1(0)-D1(3))/3 (μm/mm) | D2(0) (μm) | D2(2) (μm) | (D2(0)-D2(2))/2 (μm/mm) | D2(3) (μm) | (D2(0)-D2(3))/2 (μm/mm) | L2 (mm) | |
| 1 | 11.2 | 9.3 | 10.4 | 0.4 | 9.8 | 0.5 | 5.1 | 8.5 | 1.4 | 6.2 | 1.7 | 3.7 | 0.15 |
| 2 | 11.2 | 9.3 | 10.3 | 0.4 | 9.6 | 0.5 | 5.1 | 9.3 | 0.9 | 5.3 | 2.0 | 3.3 | 0.14 |
| 3 | 11.2 | 9.3 | 9.9 | 0.6 | 9.3 | 0.6 | 5.1 | 6.2 | 2.5 | 5.1 | 2.0 | 2.9 | 0.31 |
| 4 | 12.2 | 10.0 | 10.5 | 0.9 | 10.0 | 0.7 | 4.6 | 9.3 | 1.5 | 5.3 | 2.3 | 4.0 | 0.17 |
| 5 | 12.2 | 10.0 | 10.9 | 0.6 | 10.5 | 0.6 | 4.6 | 8.5 | 1.9 | 4.7 | 2.5 | 3.0 | 0.17 |
| 6 | 12.2 | 10.0 | 11.1 | 0.6 | 10.5 | 0.6 | 4.6 | 8.0 | 2.1 | 4.7 | 2.5 | 3.0 | 0.25 |
| 7 | 13.5 | 11.5 | 12.5 | 0.5 | 11.9 | 0.5 | 4.8 | 11.3 | 1.1 | 5.0 | 2.8 | 3.1 | 0.11 |
| 8 | 13.5 | 11.5 | 12.2 | 0.7 | 11.8 | 0.6 | 4.8 | 10.5 | 1.5 | 4.9 | 2.9 | 3.0 | 0.15 |
| 9 | 13.5 | 11.5 | 12.0 | 0.8 | 11.7 | 0.6 | 4.8 | 10.3 | 1.6 | 4.9 | 2.9 | 3.0 | 0.21 |
| 10 | 13.5 | 11.5 | 12.5 | 0.5 | 11.9 | 0.5 | 4.8 | 9.8 | 1.9 | 6.0 | 2.5 | 3.5 | 0.16 |
| 11 | 13.5 | 11.5 | 12.2 | 0.7 | 11.7 | 0.6 | 4.8 | 9.3 | 2.1 | 6.0 | 2.5 | 3.6 | 0.22 |
| 12 | 13.5 | 11.5 | 12.1 | 0.7 | 11.7 | 0.6 | 4.8 | 9.3 | 2.1 | 6.4 | 2.4 | 4.1 | 0.25 |
| 13 | 14.5 | 13.0 | 13.8 | 0.4 | 13.5 | 0.3 | 7.0 | 12.0 | 1.3 | 7.3 | 2.4 | 3.6 | 0.15 |
| 14 | 14.5 | 13.0 | 13.8 | 0.4 | 13.4 | 0.4 | 7.0 | 11.4 | 1.6 | 8.0 | 2.2 | 4.2 | 0.17 |
| 15 | 14.5 | 13.0 | 13.8 | 0.4 | 13.4 | 0.4 | 7.0 | 10.3 | 2.1 | 7.0 | 2.5 | 4.2 | 0.22 |
| 16 | 9.7 | 8.0 | 9.2 | 0.3 | 8.6 | 0.4 | 2.0 | 7.0 | 1.4 | 3.0 | 2.2 | 4.3 | 0.13 |
| 17 | 9.7 | 8.0 | 9.1 | 0.3 | 8.4 | 0.4 | 2.0 | 6.0 | 1.9 | 2.1 | 2.5 | 3.2 | 0.19 |
| 18 | 9.7 | 8.0 | 8.8 | 0.4 | 8.1 | 0.5 | 2.0 | 5.1 | 2.3 | 2.0 | 2.6 | 2.8 | 0.30 |

Fig.8

| 2nd EMBODI-MENT SAMPLE NO. | $D_{1(0)}, D_{2(0)}$ (μm) | 1st OPTICAL FIBER 10 | | | 2nd OPTICAL FIBER 20 | | | | SPLICE LOSS (dB) |
|---|---|---|---|---|---|---|---|---|---|
| | | $D_{10}$ (μm) | $D_{1(1)}$ (μm) | $(D_{1(0)}-D_{1(1)})/l$ (μm/mm) | $D_{20}$ (μm) | $D_{2(1)}$ (μm) | $(D_{2(0)}-D_{2(1)})/l$ (μm/mm) | $L_2$ (mm) | |
| 1 | 6.0 | 4.5 | 4.8 | 0.6 | 4.5 | 4.6 | 1.4 | 1.0 | 0.16 |
| 2 | 6.0 | 5.0 | 5.3 | 0.4 | 4.5 | 5.3 | 0.7 | 1.5 | 0.13 |
| 3 | 13.5 | 13.0 | 13.2 | 0.2 | 11.5 | 12.5 | 1.0 | 2.0 | 0.10 |
| 4 | 13.5 | 13.0 | 13.2 | 0.2 | 11.5 | 11.9 | 1.6 | 1.4 | 0.25 |
| 5 | 4.0 | 3.8 | 3.9 | 0.1 | 2.0 | 2.4 | 1.6 | 1.3 | 0.26 |
| 6 | 4.0 | 3.8 | 3.9 | 0.1 | 2.0 | 2.9 | 1.1 | 1.8 | 0.11 |

Fig.9

| 3rd EMBODIMENT SAMPLE NO. | TEMPERATURE (°C) AT FUSED POINT DURING HEATING | TEMPERATURE (°C) AT POSITION SEPARATED BY 2 mm FROM FUSED POINT IN 1st OPTICAL FIBER 10 | TEMPERATURE (°C) AT POSITION SEPARATED BY 2 mm FROM FUSED POINT IN 2nd OPTICAL FIBER 20 | TEMPERATURE DIFFERENCE (°C) | SPLICE LOSS (dB) |
|---|---|---|---|---|---|
| 1 | 780 | 720 | 730 | 60 | 0.10 |
| 2 | 780 | 670 | 680 | 110 | 0.22 |
| 3 | 900 | 810 | 820 | 90 | 0.16 |
| 4 | 900 | 850 | 860 | 50 | 0.08 |
| 5 | 900 | 800 | 810 | 100 | 0.18 |
| 6 | 950 | 910 | 920 | 40 | 0.07 |
| 7 | 950 | 870 | 880 | 80 | 0.11 |
| 8 | 950 | 800 | 810 | 150 | 0.32 |

Fig.10

| 4th EMBODIMENT SAMPLE NO. | TEMPERATURE (°C) AT FUSED POINT DURING HEATING | TEMPERATURE (°C) AT POSITION SEPARATED BY 1 mm FROM FUSED POINT IN 1st OPTICAL FIBER 10 | TEMPERATURE (°C) AT POSITION SEPARATED BY 1 mm FROM FUSED POINT IN 2nd OPTICAL FIBER 20 | TEMPERATURE DIFFERENCE (°C) | SPLICE LOSS (dB) |
|---|---|---|---|---|---|
| 1 | 780 | 720 | 730 | 60 | 0.17 |
| 2 | 780 | 690 | 700 | 90 | 0.23 |
| 3 | 900 | 830 | 850 | 70 | 0.22 |
| 4 | 900 | 850 | 860 | 50 | 0.14 |
| 5 | 900 | 830 | 840 | 70 | 0.24 |
| 6 | 950 | 910 | 920 | 40 | 0.10 |
| 7 | 950 | 870 | 880 | 80 | 0.25 |
| 8 | 950 | 810 | 820 | 140 | 0.33 |

Fig.11

| 5th EMBODIMENT SAMPLE NO. | DISTANCE (mm) FROM POSITION YIELDING HIGHEST HEATING TEMPERATURE TO FUSED POINT POSITION | TEMPERATURE (°C) AT FUSED POINT DURING HEATING | TEMPERATURE (°C) AT POSITION SEPARATED BY 1 mm FROM FUSED POINT | SPLICE LOSS (dB) |
|---|---|---|---|---|
| 1 | -6 | 470 | 350 | 1.31 |
| 2 | -5 | 560 | 470 | 0.96 |
| 3 | -4 | 620 | 560 | 0.72 |
| 4 | -3 | 680 | 620 | 0.48 |
| 5 | -2 | 720 | 680 | 0.29 |
| 6 | -1 | 750 | 720 | 0.16 |
| 7 | 0 | 780 | 760 | 0.10 |
| 8 | 1 | 760 | 720 | 0.17 |
| 9 | 2 | 720 | 660 | 0.32 |
| 10 | 3 | 660 | 610 | 0.50 |
| 11 | 4 | 610 | 550 | 0.73 |
| 12 | 5 | 550 | 480 | 0.91 |
| 13 | 6 | 400 | 350 | 1.20 |

Fig.12

| 6th EMBODIMENT SAMPLE NO. | DISTANCE (mm) FROM POSITION YIELDING HIGHEST HEATING TEMPERATURE TO FUSED POINT POSITION | TEMPERATURE (°C) AT FUSED POINT DURING HEATING | TEMPERATURE (°C) AT POSITION SEPARATED BY 1 mm FROM FUSED POINT | SPLICE LOSS (dB) |
|---|---|---|---|---|
| 1 | -3 | 650 | 610 | 0.55 |
| 2 | -2.5 | 680 | 650 | 0.44 |
| 3 | -2 | 710 | 680 | 0.41 |
| 4 | -1.5 | 730 | 710 | 0.37 |
| 5 | -1 | 740 | 730 | 0.23 |
| 6 | -0.5 | 750 | 740 | 0.16 |
| 7 | 0 | 760 | 750 | 0.08 |
| 8 | 0.5 | 750 | 720 | 0.17 |
| 9 | 1 | 720 | 690 | 0.26 |
| 10 | 1.5 | 690 | 670 | 0.36 |
| 11 | 2 | 670 | 650 | 0.43 |
| 12 | 2.5 | 650 | 620 | 0.48 |
| 13 | 3 | 620 | 350 | 0.58 |

Fig.13

| 7th EMBODIMENT SAMPLE NO. | TEMPERATURE (°C) AT FUSED POINT DURING HEATING | TEMPERATURE (°C) AT POSITION SEPARATED BY 2 mm FROM FUSED POINT IN 1st OPTICAL FIBER 10 | TEMPERATURE (°C) AT POSITION SEPARATED BY 2 mm FROM FUSED POINT IN 2nd OPTICAL FIBER 20 | TEMPERATURE DIFFERENCE (°C) | SPLICE LOSS (dB) |
|---|---|---|---|---|---|
| 1 | 1320 | 1260 | 1270 | 60 | 0.07 |
| 2 | 1250 | 1050 | 1070 | 200 | 0.34 |
| 3 | 1120 | 1050 | 1060 | 70 | 0.13 |
| 4 | 1060 | 950 | 960 | 110 | 0.22 |

Fig.14

| 7th EMBODIMENT SAMPLE NO. | DISTANCE (mm) FROM POSITION YIELDING HIGHEST HEATING TEMPERATURE TO FUSED POINT POSITION | TEMPERATURE (°C) AT FUSED POINT DURING HEATING | TEMPERATURE (°C) AT POSITION SEPARATED BY 1 mm FROM FUSED POINT | SPLICE LOSS (dB) |
|---|---|---|---|---|
| 1 | -6 | 930 | 910 | 1.01 |
| 2 | -5 | 990 | 930 | 0.7 |
| 3 | -4 | 1050 | 990 | 0.65 |
| 4 | -3 | 1120 | 1050 | 0.48 |
| 5 | -2 | 1170 | 1120 | 0.27 |
| 6 | -1 | 1220 | 1170 | 0.15 |
| 7 | 0 | 1260 | 1220 | 0.10 |
| 8 | 1 | 1210 | 1180 | 0.16 |
| 9 | 2 | 1180 | 1120 | 0.34 |
| 10 | 3 | 1120 | 1060 | 0.60 |
| 11 | 4 | 1060 | 1000 | 0.75 |
| 12 | 5 | 1000 | 950 | 0.89 |
| 13 | 6 | 950 | 900 | 1.09 |

OPTICAL FIBER DEVICE AND METHOD OF MAKING THE SAME

BACKGROUND OF THE INVENTION

1. Field of the Invention

The present invention relates to an optical fiber device comprising at least two kinds of optical fibers which are fusion-spliced to each other, and a method of making the same.

2. Related Background Art

Connector connection and fusion-splicing have been known to connect two kinds of optical fibers to each other. In general, the fusion-splicing is more often utilized for connecting optical fibers since the splice loss between the optical fibers is lower therein than in the connector connection. In this specification, an optical fiber device is an optical member including first and second optical fibers which are fusion-spliced to each other, whereas the size and length of the first and second optical fibers are not restricted. Examples of the optical fiber device include an optical transmission line constituted by a positive-dispersion optical fiber and a negative-dispersion optical fiber fusion-spliced to the positive-dispersion optical fiber; an optical transmission line constituted by a first optical fiber having a greater mode field diameter and a second optical fiber having a smaller mode field diameter fusion-spliced to the first optical fiber successively arranged in this order along the signal propagating direction; a dispersion-compensating module constituted by a dispersion-compensating optical fiber and a standard single-mode optical fiber fusion-spliced to one end or both ends of the dispersion-compensating optical fiber; an optical member constituted by a first optical fiber, in which a diffraction grating is formed by modulating the refractive index in a part of its light-propagating region, and a second optical fiber fusion-spliced to the first optical fiber; and the like.

When the first and second optical fibers constituting the optical fiber device have mode field diameters substantially identical to each other at a signal wavelength, e.g., 1.55 μm or 1.3 μm, before fusion-splicing in particular, the splice loss at the fused point of the optical fiber device is low. When the first and second optical fibers have mode field diameters different from each other before fusion-splicing, however, the splice loss at the fused point of the optical fiber device becomes greater.

Therefore, the vicinity of the fused point between the first and second optical fibers is heat-treated such that their mode field diameters coincide with each other after the fusing step in the latter case, so as to restrain the splice loss at the fused point from increasing. Namely, in this heating step, each of the first and second optical fibers is partly heated within a predetermined area including the fused point, so that impurities, e.g., Ge and F, added to each optical fiber (mainly composed of silica glass) are dispersed, whereby the difference in mode field diameter between the first and second optical fibers is lowered near the fused point. When the difference in mode field diameter between the fusion-spliced optical fibers is lowered as such, the splice loss at the fused point in the optical fiber device can be reduced.

In the technique disclosed in Japanese Patent Application Laid-Open No. HEI 6-18726, for example, the first and second optical fibers within a predetermined area including their fused point are heated with a small-size electric furnace in the heating step after the fusing step so as to attain the highest temperature of 1500° C. to 1700° C. and a marginal temperature (at both ends of the small-size electric furnace) of 900° C. In the technique disclosed in Japanese Patent Application Laid-Open No. HEI 4-260007, on the other hand, the first and second optical fibers within a predetermined area including their fused point are heated with a micro torch in the heating step after the fusing step so as to attain the highest temperature of 1300° C. to 1500° C. Each of these publications shows a mode field diameter distribution within a predetermined area including the fused point after the heating step.

SUMMARY OF THE INVENTION

The inventors studied conventional techniques such as those mentioned above and, as a result, have found a problem as follows. Namely, in an optical fiber device constructed by fusion-splicing optical fibers having mode field diameters different from each other, the splice loss at the fused point between the optical fibers may not fully be reduced even if the heating step is carried out after the fusing step.

In order to overcome the problem mentioned above, it is an object of the present invention to provide an optical fiber device having a structure in which the ratio of change in mode field diameter of each optical fiber near the fused point is appropriately controlled such that the splice loss at the fused point is fully reduced, and a method of making the same.

The optical fiber device according to the present invention comprises first and second optical fibers, fusion-spliced to each other, having respective mode field diameters different from each other at a signal wavelength, e.g., 1.55 μm or 1.3 μm. In particular, in order to lower the difference in mode field diameter between the first and second optical fibers, the vicinity of the fused point between the first and second optical fibers is heat-treated after fusion-splicing. At a position separated from the fused point by a distance L, the first optical fiber has a first mode field diameter $D_1(L)$, whose minimum value is $D_{10}$. On the other hand, at a position separated from the fused point by the distance L, the second optical fiber has a second mode field diameter $D_2(L)$, whose minimum value is $D_{20}$. The minimum values $D_{10}$, $D_{20}$ of the first and second mode field diameters refer to the respective mode field diameters of the first and second optical fibers at a signal wavelength (e.g., 1.55 μm or 1.3 μm) before fusion-splicing, i.e., mode field diameters excluding the vicinity of fused point where the mode field diameter changes. The "mode field diameter" in this specification, when simply mentioned as it is, refers to the mode field diameter before fusion-splicing, i.e., the minimum value of the first and second mode field diameters.

In particular, the inventors have found it preferable that, in the vicinity of the fused point between the first and second optical fibers, each of the maximum value of the ratio of change in the first mode field diameter $(D_1(L_1)-D_1(L_2))/(L_2-L_1)$ between given two points respectively separated by distances $L_1$ and $L_2$ ($>L_1$) toward the first optical fiber from the fused point between the first and second optical fibers and the maximum value of the ratio of change in the second mode field diameter $(D_2(L_1)-D_2(L_2))/(L_2-L_1)$ between given two points respectively separated by distances $L_1$ and $L_2$ ($>L_1$) toward the second optical fiber from the fused point between the first and second optical fibers be 4.0 μm/nm or less.

When the ratios of change in the first and second mode field diameters in the vicinity of the first and second optical fibers are controlled as such, the splice loss of the first and second optical fibers can effectively be reduced.

The ratios of change in the first and second mode field diameters in the vicinity of the fused point may also be controlled with reference to the first and second mode field diameters $D_1(0)$ and $D_2(0)$ at the fused point.

Namely, when the difference between the minimum value $D_{10}$ of the first mode field diameter and the minimum value $D_{20}$ of the second mode field diameter is 2 μm or more, the optical fiber device preferably satisfies the following conditions:

$D_1(L)-D_{10} \leq 0.1$ μm (where $L \geq 5$ mm), $D_2(L)-D_{20} \leq 0.1$ μm (where $L \geq 5$ mm), $(D_1(0)-D_1(2))/2 \leq 1.5$ μm/mm, $(D_2(0)-D_2(2))/2 \leq 1.5$ μm/mm, $(D_1(0)-D_1(3))/3 \leq 2.5$ μm/mm, and $(D_2(0)-D_2(3))/3 \leq 2.5$ μm/mm.

Also, when the difference between the minimum value $D_{10}$ of the first mode field diameter and the minimum value $D_{20}$ of the second mode field diameter is 2 μm or more, the optical fiber device preferably satisfies the following conditions:

$D_1(L)-D_{10} \leq 0.1$ μm (where $L \geq 5$ mm), $D_2(L)-D_{20} \leq 0.1$ μm (where $L \geq 5$ mm), $(D_1(0)-D_1(2))/2 \leq 1.0$ μm/mm, and $(D_2(0)-D_2(2))/2 \leq 1.0$ μm/mm.

Further, when the difference between the minimum value $D_{10}$ of the first mode field diameter and the minimum value $D_{20}$ of the second mode field diameter is 2 μm or more, the optical fiber device preferably satisfies the following conditions:

$D_1(L)-D_{10} \geq 0.1$ μm (where $L \leq 5$ mm), and $D_1(L)-D_{10} \leq 0.1$ μm (where $L \geq 5$ mm).

When the difference between the minimum value $D_{10}$ of the first mode field diameter and the minimum value $D_{20}$ of the second mode field diameter is 2 μm or less, by contrast, the optical fiber device preferably satisfies the following conditions:

$D_1(L)-D_{10} \leq 0.1$ μm (where $L \geq 3$ mm), $D_2(L)-D_{20} \leq 0.1$ μm (where $L \geq 3$ mm), $(D_1(0)-D_1(1))/1 \leq 1.5$ μm/mm, and $(D_2(0)-D_2(1))/1 \leq 1.5$ μm/mm.

Also, when the difference between the minimum value $D_{10}$ of the first mode field diameter and the minimum value $D_{20}$ of the second mode field diameter is 2 μm or less, the optical fiber device preferably satisfies the following conditions:

$D_1(L)-D_{10} \geq 0.1$ μm (where $L \leq 1.5$ mm), and $D_1(L)-D_{10} \leq 0.1$ μm (where $L \geq 2.0$ mm).

The ratios of change in the first mode field diameter $D_1$ (L) and second mode field diameter $D_2$ (L) are appropriately controlled according to the difference between the minimum value $D_{10}$ of the first mode field diameter (the mode field diameter before fusion-splicing) and the minimum value $D_{20}$ of the second mode field diameter (the mode field diameter before fusion-splicing) as in the foregoing, whereby the splice loss at the fused point between the first and second optical fibers is effectively lowered.

Though there is a possibility that the splice loss may not fully be reduced when one of the minimum value $D_{10}$ of the first mode field diameter and the minimum value $D_{20}$ of the second mode field diameter is 2 μm or more but 7 μm or less, i.e., when the mode field diameter is relatively small in the first and second optical fibers before fusion-splicing, the splice loss at the fused point between the first and second optical fibers is fully reduced if the ratios of change in the first and second mode field diameters are controlled as mentioned above in the optical fiber device according to the present invention.

Though mismatching is more likely to occur between the first and second mode field diameters when one of the minimum value $D_{10}$ of the first mode field diameter and the minimum value $D_{20}$ of the second mode field diameter is 10 μm or more but 14 μm or less, i.e., when the mode field diameter is relatively large in the first and second optical fibers before fusion-splicing, the splice loss at the fused point between the first and second optical fibers is fully reduced if the ratios of change in the first and second mode field diameters are controlled as mentioned above in the optical fiber device according to the present invention.

The method of making an optical fiber device according to the present invention is characterized in that first and second optical fibers having respective mode field diameters different from each other are fusion-spliced, and then the vicinity of the fused point between the first and second optical fibers is heat-treated so as to control the ratio of change in mode field diameter in the vicinity of the fused point. Specifically, the method of making an optical fiber device according to the present invention comprises a fusing step of fusion-splicing one end of the first optical fiber and one end of the second optical fiber to each other, and a heating step of heating a predetermined region including the fused point between the first and second optical fibers after the fusing step.

In particular, it is preferred that, when the difference in mode field diameter between the first and second optical fibers (the difference in mode field diameter before fusion-splicing) is 2 μm or more, the first and second optical fibers be partly heated in the heating step such that the difference between the highest and lowest temperatures in a region having a length of 4 mm centered at the fused point between the first and second optical fibers becomes 100° C. or less (thus heating the vicinity of the fused point between the first and second optical fibers). More preferably, in the heating step, the first and second optical fibers are partly heated such that a position separated by 1.0 mm or less from the fused point between the first and second optical fibers toward one of the first and second optical fibers attains the highest temperature.

When the difference in mode field diameter between the first and second optical fibers is 2 μm or less, by contrast, it is preferred that the first and second optical fibers be partly heated in the heating step such that the difference between the highest and lowest temperatures in a region having a length of 2 mm centered at the fused point between the first and second optical fibers becomes 100° C. or less (thus heating the vicinity of the fused point between the first and second optical fibers). More preferably, in the heating step, the first and second optical fibers are partly heated such that a position separated by 0.5 mm or less from the fused point between the first and second optical fibers toward one of the first and second optical fibers attains the highest temperature.

In the method mentioned above, the temperature distribution in the vicinity of the fused point between the first and second optical fibers is appropriately controlled according to the difference in mode field diameter between the first and second optical fibers (the difference between the minimum value $D_{10}$ of the first mode field diameter and the minimum value $D_{20}$ of the second mode field diameter) in the heating step after the fusing step, whereby an optical fiber device having a lower splice loss at the fused point is obtained.

Preferably, in the method of making an optical fiber device according to the present invention, a flame formed by supplying a flammable gas and an oxygen gas to a micro torch (burner) is utilized in the heating step so as to heat a predetermined region near the fused point between the first and second optical fibers. It is also preferred that an electric heater be utilized so as to heat a predetermined region near the fused point between the first and second optical fibers. Each of these heating methods makes it possible to appropriately control the temperature distribution in the vicinity of the fused point between the first and second optical fibers.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 4A and 4B are tables listing the ratio of change in mode field diameter for each heating condition according to the graph shown in FIG. 3;

FIG. 5A is a view for explaining a first embodiment of the method of making an optical fiber device according to the present invention, whereas

FIG. 6A is a view for explaining the first embodiment of the method of making an optical fiber device according to the present invention, whereas

FIG. 7 is a table listing various items of samples (sample Nos. 1 to 18) corresponding to a first embodiment of the optical fiber device according to the present invention;

FIG. 8 is a table listing various items of samples (sample Nos. 1 to 6) corresponding to a second embodiment of the optical fiber device according to the present invention;

FIG. 9 is a table listing various items of samples (sample Nos. 1 to 8) corresponding to a third embodiment of the optical fiber device according to the present invention;

FIG. 10 is a table listing various items of samples (sample Nos. 1 to 8) corresponding to a fourth embodiment of the optical fiber device according to the present invention;

FIG. 11 is a table listing various items of samples (sample Nos. 1 to 13) corresponding to a fifth embodiment of the optical fiber device according to the present invention;

FIG. 12 is a table listing various items of samples (sample Nos. 1 to 13) corresponding to a sixth embodiment of the optical fiber device according to the present invention;

FIG. 13 is a table listing various items of sample Nos. 1 to 4 corresponding to a seventh embodiment of the optical fiber device, which have been subjected to a heat treatment similar to that of the third embodiment; and FIG. 14 is a table listing various items of sample Nos. 5 to 17 corresponding to the seventh embodiment of the optical fiber device, which have been subjected to a heat treatment similar to that of the fifth embodiment.

DETAILED DESCRIPTION OF THE PREFERRED EMBODIMENTS

In the following, embodiments of the optical fiber device according to the present invention and the method of making the same will be explained with reference to FIGS. 1 to 3, 4A to 6B, and 7 to 14. In the explanation of the drawings, constituents identical to each other will be referred to with numerals identical to each other without repeating their overlapping descriptions.

Figure 1:
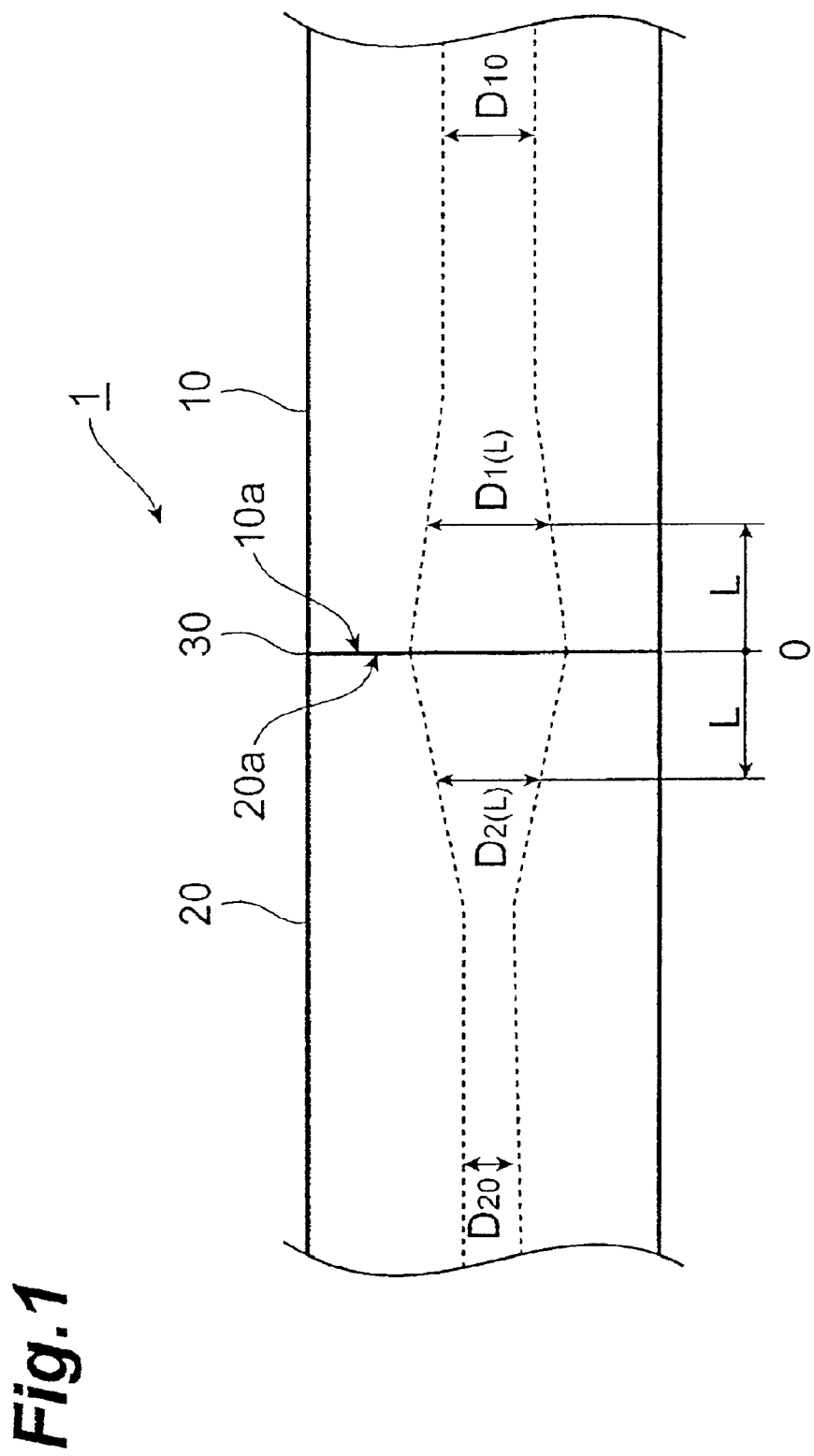
FIG. 1 is a view showing the structure of the optical fiber device according to the present invention.

FIG. 1 is a view showing the structure of the optical fiber device according to the present invention. In FIG. 1, the optical fiber device 1 comprises a first optical fiber 10 and a second optical fiber 20 which have respective end faces 10a and 10b fusion-spliced to each other. In this drawing, broken lines shown in each of the first and second optical fibers 10 and 20 indicate the mode field diameter at a signal wavelength, e.g., 1.55 μm or 1.3 μm. The first mode field diameter of the first optical fiber 10 before fusion-splicing, i.e., the minimum value of the first mode field diameter, is $D_{10}$, whereas the second mode field diameter of the second optical fiber 20 before fusion-splicing, i.e., the minimum value of the second mode field diameter, is $D_{20}$ ($<D_{10}$).

In the optical fiber device 1 according to the present invention, the vicinity of the fused point 30 is heat-treated such that the ratios of change in the first and second mode field diameters in the first and second optical fibers 10 and 20 are set appropriately after the end face 10a of the first optical fiber 10 and the end face 20a of the optical fiber are fusion-spliced to each other. This heat treatment lowers the splice loss between the first and second optical fibers 10, 20 as compared with cases where a heat treatment is carried out such that the difference between the first and second mode field diameters is simply lowered.

Figure 2:
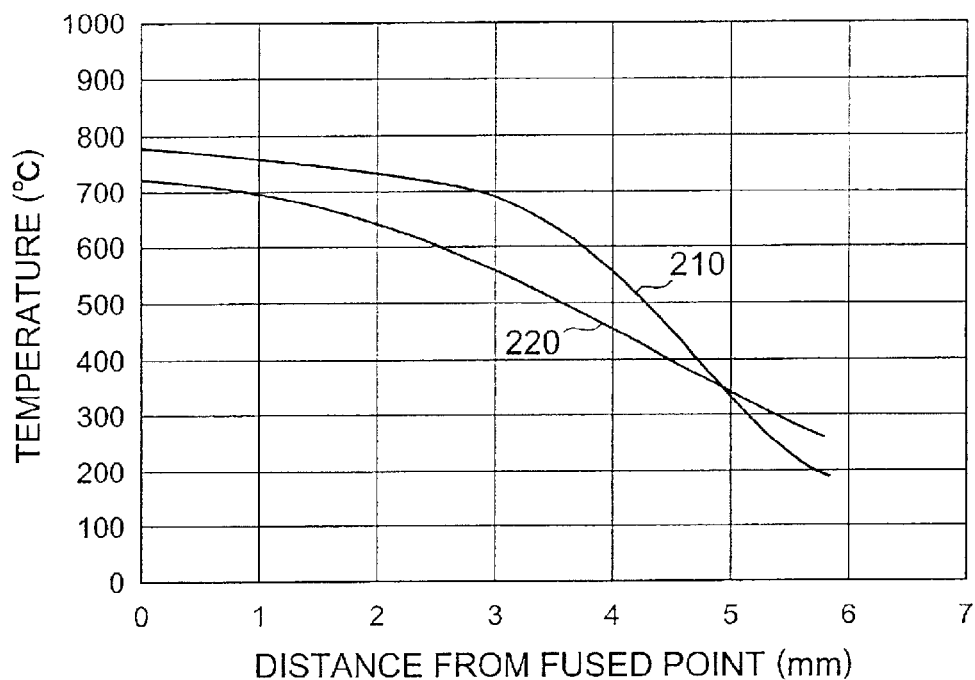
FIG. 2 is a graph showing changes in temperature distribution in the optical fiber occurring when a heating condition (the distance between a micro torch and the optical fiber) is changed.

Specifically, each of temperature distributions of the first and second optical fibers 10, 20 remarkably varies depending on the heating condition in the vicinity of the fused point 30. FIG. 2 is a graph showing changes in temperature distribution yielded when a heating condition (the distance between a micro torch and an optical fiber) is changed. In FIG. 2, curve 210 shows the temperature distribution of each of the first and second optical fibers 10, 20 when they are heated in a state where the micro torch is separated from the fused point 30 by 1 mm (first case), whereas curve 220 shows the temperature distribution of each of the first and second optical fibers 10, 20 when they are heated in a state where the micro torch is separated from the fused point 30 by 3 mm (second case).

As can be seen from curves 210 and 220, the temperature of the first and second optical fibers 10, 20 decreases as the position is farther separated from the fused point 30 more remarkably in the second case than in the first case. In general, since the distance by which impurities (refractive index regulating agents) added into an optical fiber disperse depends on the temperature within the optical fiber, the area within which impurities disperse is known to increase as the internal temperature is higher. Also, the mode field diameter of the optical fiber varies depending on the dispersing area of impurities. Therefore, the mode field diameter drastically decreases as the position is farther separated from the fused point 30 in the second case (where the distance between the optical fiber and the micro torch is 3 mm). In the first case (where the distance between the optical fiber and the micro torch is 1 mm), by contrast, the mode field diameter is expected to decrease less drastically than that in the second case as the position is farther separated from the fused point 30.

Figure 3:
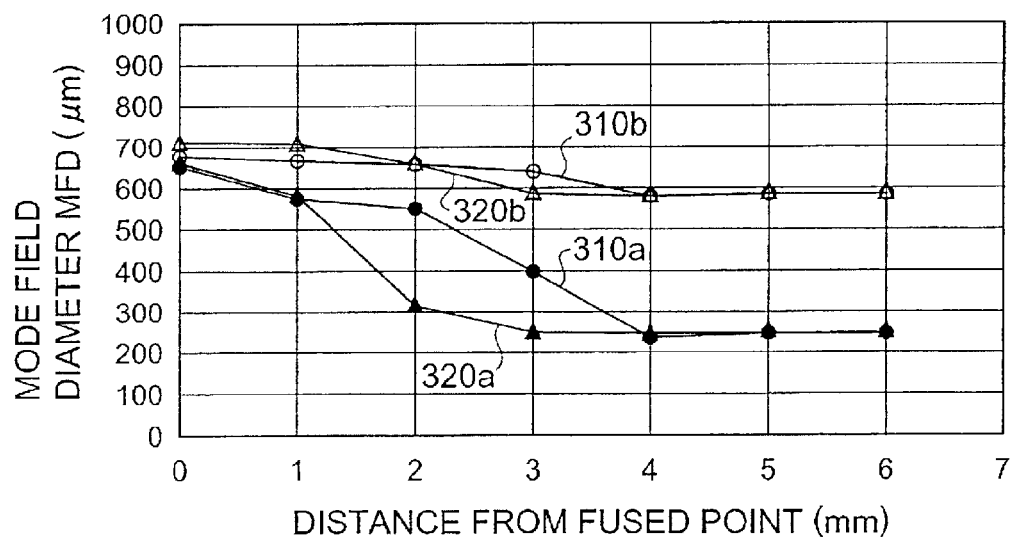
FIG. 3 is a graph showing changes in mode field diameter occurring in two kinds of optical fibers when the heating condition is changed.

FIG. 3 is a graph showing results of measurement carried out for verifying the above-mentioned relationship between the mode field diameter and temperature distribution. The first optical fiber 10 prepared in this measurement is an optical fiber (SMF) with a relatively large mode field diameter comprising a core made of pure silica and a cladding doped with F, whereas the second optical fiber 20 is a dispersion-compensating optical fiber (DCF) having a relatively small mode field diameter. In FIG. 3, curves 310a and 310b show respective mode field diameter changes in the DCF and SMF when the distance between the fused point 30 and the micro torch is set to 1 mm, whereas curves 320a and 320b show respective mode field diameter changes in the DCF and SMF when the distance between the fused point 30 and the micro torch is set to 3 mm.

FIG. 4A is a table showing the mode field diameter per unit distance (1 mm) from the fused point 30 and its ratio of change concerning each of the DCF (first optical fiber 10) indicated by curve 310a and the SMF (second optical fiber 20) indicated by curve 310b (the optical fiber device in the first case). On the other hand, FIG. 4B is a table showing the mode field diameter per unit distance (1 mm) from the fused point 30 and its ratio of change concerning each of the DCF (first optical fiber 10) indicated by curve 320a and the SMF (second optical fiber 20) indicated by curve 320b (the optical fiber device in the second case).

While the optical fiber device in the first case (constituted by the DCF indicated by curve 310a and the SMF indicated by curve 310b) exhibits a splice loss of 0.11 dB, the optical fiber device in the first case (constituted by the DCF indicated by curve 320a and the SMF indicated by curve 320b) exhibits a splice loss of 0.31 dB. While the maximum ratio of change between given two points is 3.2 ($\mu$m/mm) in the optical fiber device of the first case, that in the optical fiber device of the second case is 5.3 ($\mu$m/mm).

From the foregoing, it is seen that the optical fiber device 1 realizing a lower splice loss is obtained according to the present invention when the vicinity of the fused point 30 between the first and second optical fibers 10, 20 is heat-treated such that the maximum ratio of change in mode field diameter becomes 4.0 $\mu$m/mm or less in each of the first and second optical fibers 10, 20.

Though the above-mentioned maximum ratio of change is the ratio of change in mode field diameter between given two points separated by predetermined distances from the fused point 30, an optimal condition can also be derived from the ratio of change in mode field diameter with reference to the fused point 30 between the first and second optical fibers 10, 20.

Specifically, in the optical fiber device 1, let $D_1(L)$ be the first mode field diameter at a position separated from the fused point 30 toward the first optical fiber 10 by the distance L (unit:mm), $D_2(L)$ be the second mode field diameter at a position separated from the fused point 30 toward the second optical fiber 20 by the distance L (unit:mm), $D_{10}$ be the first mode field diameter (minimal value) before fusion-splicing, and $D_{20}$ be the second mode field diameter (minimal value) before fusion-splicing.

When the difference between the minimum value $D_{10}$ of the first mode field diameter and the minimum value $D_{20}$ of the second mode field diameter is 2 $\mu$m or greater, the optical fiber device 1 preferably satisfies the following expressions (1A) to (1F):

$$D_1(L)-D_{10} \leq 0.1 \ \mu m \ (\text{where } L \geq 5), \tag{1A}$$

$$D_2(L)-D_{20} \leq 0.1 \ \mu m \ (\text{where } L \geq 5), \tag{1B}$$

$$(D_1(0)-D_1(2))/2 \leq 1.5 \ \mu m/mm, \tag{1C}$$

$$(D_2(0)-D_2(2))/2 \leq 1.5 \ \mu m/mm, \tag{1D}$$

$$(D_1(0)-D_1(3))/3 \leq 2.5 \ \mu m/mm, \text{ and} \tag{1E}$$

$$(D_2(0)-D_2(3))/3 \leq 2.5 \ \mu m/mm. \tag{1F}$$

Namely, in each of the first and second optical fibers 10, 20, there is a position where the difference between the mode field diameters before and after the fusion-splicing becomes 0.1 $\mu$m or less within the area where the distance L from the fused point 30 is 5 mm or more (expressions (1A) and (1B)). Between the position where the distance L from the fused point 30 is 2 mm and the fused point 30, the average ratio of change in mode field diameter is 1.5 $\mu$m/mm or less (expressions (1C) and (1D)). Between the position where the distance L from the fused point 30 is 3 mm and the fused point 30, the average ratio of change in mode field diameter is 2.5 $\mu$m/mm or less (expressions (1E) and (1F)).

When the difference between the respective mode field diameters $D_{10}$, $D_{20}$ of the first and second optical fibers 10, 20 before fusion-splicing is 2 $\mu$m or greater, the optical fiber device 1 may also satisfy the following expressions (2A) to (2D):

$$D_1(L)-D_{10} \leq 0.1 \ \mu m \ (\text{where } L \geq 5), \tag{2A}$$

$$D_2(L)-D_{20} \leq 0.1 \ \mu m \ (\text{where } L \geq 5), \tag{2B}$$

$$(D_1(0)-D_1(2))/2 \leq 1.0 \ \mu m/mm, \text{ and} \tag{2C}$$

$$(D_2(0)-D_2(2))/2 \leq 1.0 \ \mu m/mm. \tag{2D}$$

Here, in each of the first and second optical fibers 10, 20, there is a position where the difference between the mode field diameters before and after the fusion-splicing becomes 0.1 $\mu$m or less within the area where the distance L from the fused point 30 is 5 mm or more (expressions (2A) and (2B)). Between the fused point 30 and the position where the distance L from the fused point 30 is 2 mm, the average ratio of change in mode field diameter is 1.0 $\mu$m/mm or less (expressions (2C) and (2D)).

When the difference between the respective mode field diameters $D_{10}$, $D_{20}$ of the first and second optical fibers 10, 20 before fusion-splicing is 2 $\mu$m or less, the optical fiber device 1 preferably satisfies the following expressions (3A) to (3D):

$$D_1(L)-D_{10} \leq 0.1 \ \mu m \ (\text{where } L \geq 3), \tag{3A}$$

$$D_2(L)-D_{20} \leq 0.1 \ \mu m \ (\text{where } L \geq 3), \tag{3B}$$

$$(D_1(0)-D_1(1))/1 \leq 1.5 \ \mu m/mm, \text{ and} \tag{3C}$$

$$(D_2(0)-D_2(1))/1 \leq 1.5 \ \mu m/mm. \tag{3D}$$

Here, in each of the first and second optical fibers 10, 20, there is a position where the difference between the mode field diameters before and after the fusion-splicing becomes 0.1 $\mu$m or less within the area where the distance L from the fused point 30 is 3 mm or more (expressions (3A) and (3B)). Between the fused point 30 and the position where the distance L from the fused point 30 is 1 mm, the average ratio of change in mode field diameter is 1.5 $\mu$m/mm or less (expressions (3C) and (3D)).

When the difference between the respective mode field diameters $D_{10}$, $D_{20}$ of the first and second optical fibers 10, 20 before fusion-splicing is 2 $\mu$m or greater while the value $D_{10}$ is greater than the value $D_{20}$, the optical fiber device 1 preferably satisfies the following expressions (4A) and (4B):

$$D_1(L)-D_{10} \geq 0.1 \ \mu m \ (\text{where } L \leq 3), \text{ and} \tag{4A}$$

$$D_1(L)-D_{10} \leq 0.1 \ \mu m \ (\text{where } L \geq 5). \tag{4B}$$

Here, in the first optical fiber 10 having the mode field diameter $D_{10}$ greater than the mode field diameter $D_{20}$ before fusion-splicing, a position where the difference between the mode field diameters before and after the fusion-splicing becomes 0.1 $\mu$m or less exists within an area where the distance L from the fused point 30 is 3 mm or more but 5 mm or less (expressions (4A) and (4B)).

More preferably, when the difference between the respective mode field diameters $D_{10}$, $D_{20}$ of the first and second optical fibers 10, 20 before fusion-splicing is 2 $\mu$m or greater while the value $D_{10}$ is greater than the value $D_{20}$, the optical fiber device 1 satisfies the following expressions (5A) and (5B):

$$D_1(L)-D_{10} \geq 0.1 \ \mu m \ (\text{where } L \leq 1.5), \text{ and} \tag{5A}$$

$$D_1(L)-D_{10} \leq 0.1 \ \mu m \ (\text{where } L \geq 3.0). \tag{5B}$$

Here, in the first optical fiber 10 having the mode field diameter $D_{10}$ greater than the mode field diameter $D_{20}$ before fusion-splicing, a position where the difference between the mode field diameters before and after the fusion-splicing becomes 0.1 $\mu$m or less exists within an area where the distance L from the fused point 30 is 1.5 mm or more but 3.0 mm or less (expressions (5A) and (5B)).

There is a possibility that the splice loss may not fully be reduced when one of the mode field diameters $D_{10}$ and $D_{20}$ (minimal values) of the first and second optical fibers 10, 20 before fusion-splicing is 2 $\mu$m or more but 7 $\mu$m or less. In the optical fiber device 1 according to the present invention, however, the vicinity of the fused point 30 is heat-treated such that the ratios of change in mode field diameter in the first and second optical fibers 10, 20 are set as mentioned above. Therefore, the splice loss at the fused point 30 is fully reduced. On the other hand, mismatching is more likely to occur between the first and second optical fibers 10, 20 when one of the mode field diameters $D_{10}$ and $D_{20}$ before fusion-splicing is 10 $\mu$m or more but 14 $\mu$m or less. In the optical fiber device 1 according to the present invention, however, the vicinity of the fused point 30 is heat-treated such that the ratios of change in mode field diameter in the first and second optical fibers 10, 20 are set as mentioned above. Therefore, the splice loss at the fused point 30 is fully reduced.

The method of making an optical fiber device according to the present invention will now be explained. Initially, in this method, the first and second optical fibers 10, 20 are prepared. Then, thus prepared first and second optical fibers 10, 20 are stripped of coatings in the vicinity of their respective end parts to be fusion-spliced to each other. In the subsequent fusing step, the first and second optical fibers 10, 20 are aligned with each other such that their optical axes are superposed on the same line, and the first and second optical fibers 10, 20 are fusion-spliced to each other in a state where their respective end faces 10a, 20a are butted against each other. In the fusing step, the first and second optical fibers 10, 20 are arranged such that thus butted end faces 10a, 20a are positioned between a pair of electrodes, whereas the respective end faces 10a, 20a of the first and second optical fibers 10, 20 are fusion-spliced upon arc discharging between the pair of electrodes.

A heating step is carried out after the fusing step. In the heating step, a flame formed by supplying a flammable gas (e.g., propane gas) and an oxygen gas to a micro torch, an electric heater, a $CO_2$ laser, or the like is utilized as a heating source. Then, a predetermined area including the fused point 30 is heat-treated by the heating source. The heating step disperses dopants, e.g., Ge and F, added to the first and second optical fibers 10, 20 mainly composed of silica glass, thereby lowering the difference between the mode field diameters $D_1(0)$ and $D_2(0)$ of the first and second optical fibers 10, 20 in the vicinity of the fused point 30. By way of such a heating step, the splice loss of the optical fiber device 1 at the fused point 30 is reduced.

Subsequently, after the heating step, the vicinity of the fused point 30 between the first and second optical fibers 10, 20 is coated again, and is reinforced with a metal or the like if necessary. The optical fiber device 1 according to the present invention is obtained by way of the foregoing steps.

In the method of making an optical fiber device according to the present invention, the temperature distribution of the first and second optical fibers 10, 20 at the time of the heating step is appropriately set according to the difference between the first mode field diameter $D_{10}$ of the first optical fiber 10 before fusion-splicing and the second mode field diameter $D_{20}$ of the second optical fiber 20 before fusion-splicing (see FIG. 2). As a consequence, the splice loss of thus obtained optical fiber device 1 at the fused point 30 is further lowered. Specifically, the following heat treatment is carried out in the heating step.

Figure 5A:
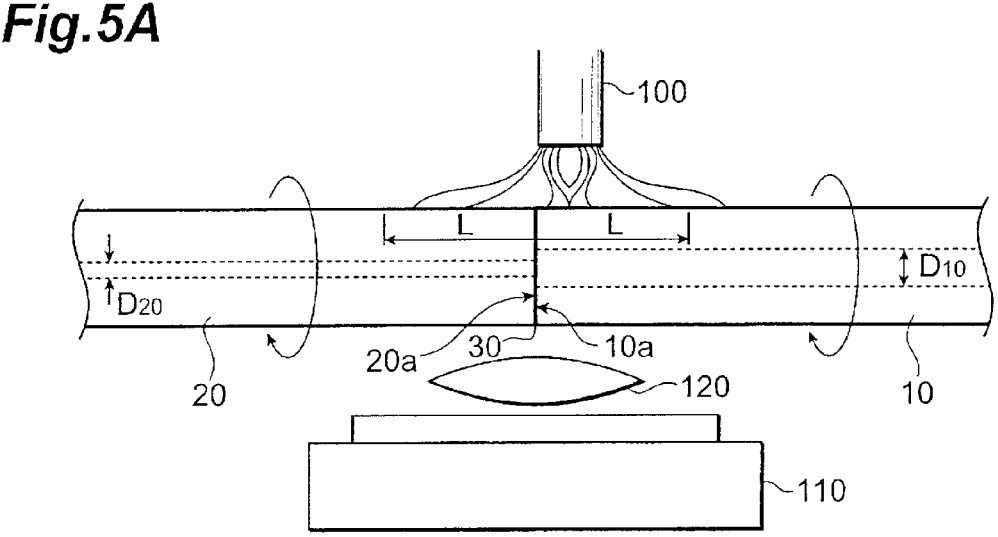
Figure 5B:
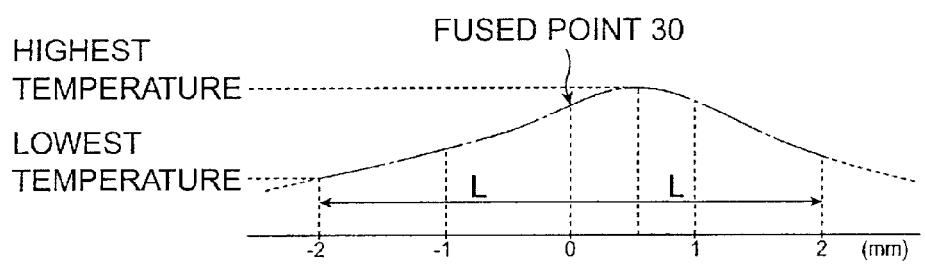
FIG. 5B is a chart showing a temperature distribution within the optical fiber in the heating step in the first embodiment.

Namely, when the difference between the respective mode field diameters $D_{10}$, $D_{20}$ of the first and second optical fibers 10, 20 is 2 $\mu$m or greater, the first and second optical fibers 10, 20 are partly heated in the heating step after the fusing step such that the difference between the highest and lowest temperatures in a region having a length of 4 mm centered at the fused point 30 becomes 100° C. or less (see FIGS. 5A and 5B). Here, FIG. 5A is a view showing the heating step in which the vicinity of the fused point 30 is heated with a micro torch 100 acting as heating means while the temperature distribution is monitored with an infrared-ray radiation thermometer 110, whereas FIG. 5B is a graph showing the temperature distribution in the vicinity of the fused point 30 monitored by the infrared-ray radiation thermometer 110.

Figure 6A:
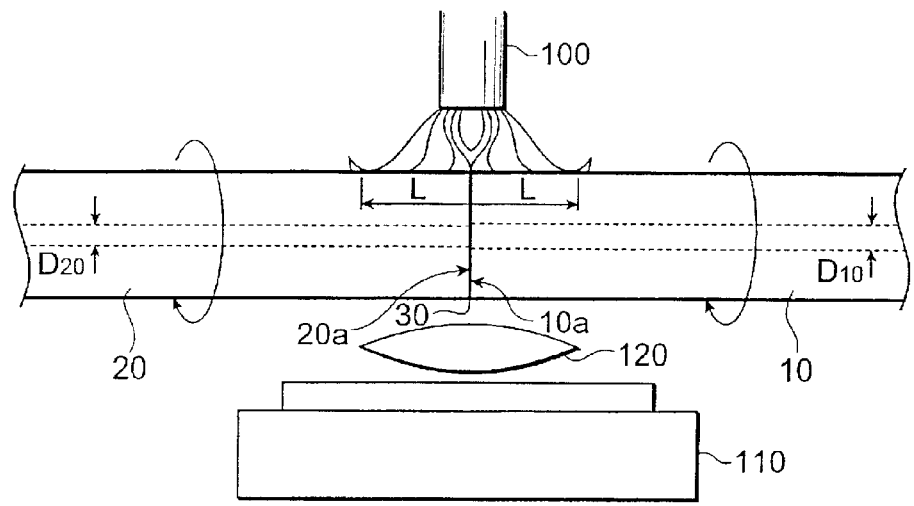
Figure 6B:
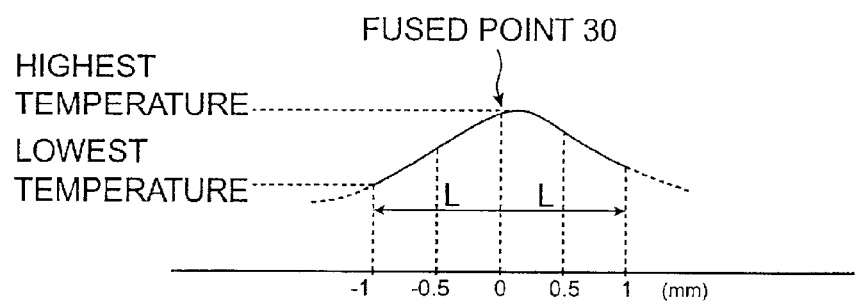
FIG. 6B is a chart showing a temperature distribution within the optical fiber in the heating step in the first embodiment.

Alternatively, when the difference between the respective mode field diameters $D_{10}$, $D_{20}$ of the first and second optical fibers 10, 20 before fusion-splicing is 2 $\mu$m or less, the first and second optical fibers 10, 20 are partly heated in the heating step such that the difference between the highest and lowest temperatures in a region having a length of 2 mm centered at the fused point 30 becomes 100° C. or less (see FIGS. 6A and 6B) Here, FIG. 6A is a view showing the heating step in which the vicinity of the fused point 30 is heated with the micro torch 100 acting as heating means while the temperature distribution is monitored with the infrared-ray radiation thermometer 110, whereas FIG. 6B is a graph showing the temperature distribution in the vicinity of the fused point 30 monitored by the infrared-ray radiation thermometer 110.

When the difference between the respective mode field diameters $D_{10}$, $D_{20}$ of the first and second optical fibers 10, 20 before fusion-splicing is 2 μm or greater, the first and second optical fibers 10, 20 may be partly heated in the heating step in this method such that the highest temperature is attained at a position separated by 1.0 mm or less (distance L) from the fused point 30 toward the first optical fiber 10 or second optical fiber 20 (FIGS. 5A and 5B).

When the difference between the respective mode field diameters $D_{10}$, $D_{20}$ of the first and second optical fibers 10, 20 before fusion-splicing is 2 μm or less, the first and second optical fibers 10, 20 may be partly heated in the heating step in this method such that the highest temperature is attained at a position separated by 0.5 mm or less (distance L) from the fused point 30 toward the first optical fiber 10 or second optical fiber 20 (see FIGS. 6A and 6B).

As in the foregoing, the temperature distribution of the first and second optical fibers 10, 20 in the vicinity of the fused point 30 is set appropriately in the heating step. The temperature distribution can be set as such when the structure of the heating source such as the micro torch 100 or electric heater, the flow rate of each gas supplied to the micro torch 100, the distance between the heating source and each optical fiber, and the like are adjusted. For measuring the temperature distribution of each of the first and second optical fibers 10, 20 in the heating step, a noncontact type thermometer is favorably used. In this embodiment, the infrared-ray radiation thermometer 110 is utilized. When the infrared-ray radiation thermometer 110 is utilized, a magnifying lens 120 is disposed between the infrared-ray radiation thermometer 110 and the first and second optical fibers 10, 20. Since each of the first and second optical fibers 10, 20 is mainly composed of silica glass and has a columnar form, the emissivity is set to 0.5. In general, when the heating source such as the micro torch 100 or electric heater is utilized, the temperature distribution measured by an infrared-ray radiation thermometer has such a form that the temperature monotonously decreases toward both side from the position at which the temperature attains the maximum value.

The highest heating temperature at the time of heating is required to be such a temperature that the main ingredient of the first and second optical fibers 10, 20 is not softened. When the first and second optical fibers 10, 20 are mainly composed of silica glass, the surface temperature measured by the infrared-ray radiation thermometer 110 at each position of the first and second optical fibers 10, 20 is needed to be about 1300° C. or less. On the other hand, the heating temperature for a region to enhance the mode field diameter (in the vicinity of the fused point 30) in the first and second optical fibers 10, 20 is required to be a temperature at which dopants added to the first and second optical fibers 10, 20 can disperse. Namely, when the dopants are Ge and F, the surface temperature measured by the infrared-ray radiation thermometer 110 in the heating region in the first and second optical fibers 10, 20 is needed to be about 500° C. or higher.

The optical fiber device 1 obtained by way of the foregoing heating step can easily satisfy any of the conditions of expressions (1A) to (1F), (2A) to (2D), and (4A) and (4B) when the difference between the respective mode field diameters $D_{10}$, $D_{20}$ of the first and second optical fibers 10, 20 before fusion-splicing is 2 μm or greater, and any of the conditions of expressions (3A) to (3D) and (5A) and (5B) when the difference between the respective mode field diameters $D_{10}$, $D_{20}$ of the first and second optical fibers 10, 20 before fusion-splicing is 2 μm or less.

In thus obtained optical fiber device 1, whether the mode field diameter is enhanced in the vicinity of the fused point 30 between the first and second optical fibers 10, 20 or not, i.e., dopants are dispersed or not, can be verified by the following FFP method (Katsuhiko Okubo, "Optical Fiber Technology in ISDN Era," Rikogakusha, Chapter 3, 3–10 to 3–11). Namely, at the position separated from the fused point 30 by a distance L, each of the first and second optical fibers 10, 20 is cut, near-field patterns of light emitted from thus cut end faces are measured, and respective mode field diameters $D_1$ (L), $D_2$ (L) at the end faces are determined according to the near-field patterns. The cutting of each of the optical fibers 10, 20 is repeated while the value of distance L is gradually increased, and the mode field diameters $D_1(L)$, $D_2(L)$ at thus cut end faces are successively determined, whereby the ratio of change in mode field diameter is obtained. Alternatively, the distribution of each dopant in the cut end face is analyzed by EPMA and the like, whereby it can be seen according to results of analysis whether the dopant is dispersed or not.

The optical fiber device according to the present invention and the method of making the same will now be explained.

The optical fiber device according to a first embodiment comprises first and second optical fibers 10, 20 in which the difference between mode field diameters $D_{10}$, $D_{20}$ before fusion-splicing is 2 μm or greater, i.e., $D_{10}-D_{20} \geq 2$ μm. After the first and second optical fibers 10, 20 are fused to each other, a predetermined region including the fused point 30 between the first and second optical fibers 10, 20 is heated with a micro torch (see FIG. 5A), whereby the optical fiber device according to the first embodiment is obtained. Concerning a plurality of samples thus obtained, the inventors determined mode field diameters $D_1(0)$, $D_2(0)$, $D_1(2)$, $D_2(2)$, $D_1(3)$, and $D_2(3)$ at respective positions where the distance L=0, 2 mm, and 3 mm. Also, the inventors measured the mode field diameters $D_1(L)$, $D_2(L)$ at the respective positions separated from the fused point 30 by distances L (in increments of 0.1 mm), and determined the distance L at which the value of $D_1(L)-D_{10}$ becomes 0.1 μm or less and the distance L at which the value of $D_2(L)-D_{20}$ becomes 0.1 μm or less.

FIG. 7 is a table listing various items mentioned above concerning sample Nos. 1 to 18 corresponding to the optical fiber device according to the first embodiment. Successively from the left side, the table of FIG. 7 shows sample No., and the mode field diameters $D_1(0)$ and $D_2(0)$ at the fused point 30. In succession, concerning the first optical fiber 10, the table shows the mode field diameter $D_{10}$ before fusion-splicing, the mode field diameter $D_1(2)$ at the position where the distance L=2 mm, the average ratio of change $(D_1(0)-D_1(2))/2$ between the fused point 30 and the position where the distance L=2 mm, the mode field diameter $D_1(3)$ at the position where the distance L=3 mm, and the average ratio of change $(D_1(0)-D_1(3))/3$ between the fused point 30 and the position where the distance L=3 mm. In succession, concerning the second optical fiber 20, the table shows the mode field diameter $D_{20}$ before fusion-splicing, the mode field diameter $D_2(2)$ at the position where the distance L=2 mm, the average ratio of change $(D_2(0)-D_2(2))/2$ between the fused point 30 and the position where the distance L=2 mm, the mode field diameter $D_2(3)$ at the position where the distance L=3 mm, the average ratio of change $(D_2(0)-D_2(3))/3$ between the fused point 30 and the position where the distance L=3 mm, and a distance $L_2$ at which the value of $D_2(L)-D_{20}$ becomes 0.1 μm or less from the fused point 30. On the rightmost side, the table shows the splice loss at the fused point 30. As can be seen from FIG. 7, the splice loss of the optical fiber device according to the first embodiment is suppressed to 0.2 dB or less in general when the above-mentioned conditions of expressions (1A) to (1F), (2A) to (2D), or (4A) and (4B) are satisfied.

The optical fiber device according to a second embodiment comprises first and second optical fibers 10, 20 in which the difference between mode field diameters $D_{10}$, $D_{20}$ before fusion-splicing is 2 μm or less, i.e., $0 \leq D_{10}-D_{20} \leq 2$ μm. After the first and second optical fibers 10, 20 are fused to each other, a predetermined region including the fused point 30 between the first and second optical fibers 10, 20 is heated with a micro torch (see FIG. 6A), whereby the optical fiber device according to the second embodiment is obtained. Concerning a plurality of samples thus obtained, the inventors determined mode field diameters $D_1(0)$, $D_2(0)$, $D_1(1)$, and $D_2(1)$, the distance L at which the value of $D_1(L)-D_{10}$ becomes 0.1 μm or less, and the distance L at which the value of $D_2(L)-D_{20}$ becomes 0.1 μm or less.

FIG. 8 is a table listing various items mentioned above concerning sample Nos. 1 to 6 corresponding to the optical fiber device according to the second embodiment. Successively from the left side, the table of FIG. 8 shows sample No., and the mode field diameters $D_1(0)$ and $D_2(0)$ at the fused point 30. In succession, concerning the first optical fiber 10, the table shows the mode field diameter $D_{10}$ before fusion-splicing, and the mode field diameter $D_1(1)$ at the position where the distance L=1 mm, the average ratio of change $(D_1(0)-D_1(1))/1$ between the fused point 30 and the position where the distance L=1 mm. In succession, concerning the second optical fiber 20, the table shows the mode field diameter $D_{20}$ before fusion-splicing, the mode field diameter $D_2(1)$ at the position where the distance L=1 mm, the average ratio of change $(D_2(0)-D_2(1))/1$ between the fused point 30 and the position where the distance L=1 mm, and a distance $L_2$ at which the value of $D_2(L)-D_{20}$ becomes 0.1 μm or less from the fused point 30. On the rightmost side, the table shows the splice loss at the fused point 30. As can be seen from FIG. 8, the splice loss of the optical fiber device according to the second embodiment is suppressed to 0.2 dB or less in general when the above-mentioned conditions of expressions (3A) to (3D) or (5A) and (5B) are satisfied.

The optical fiber device according to a third embodiment comprises first and second optical fibers 10, 20 in which the difference between mode field diameters $D_{10}$, $D_{20}$ before fusion-splicing is 2 μm or greater, i.e., $D_{10}-D_{20} \geq 2$ μm. After the first and second optical fibers 10, 20 are fused to each other, a predetermined region including the fused point 30 between the first and second optical fibers 10, 20 is heated with a micro torch (see FIG. 5A), whereby the optical fiber device according to the third embodiment is obtained. A propane gas and an oxygen gas are supplied to the micro torch. The inventors determined a temperature distribution in the vicinity of the fused point 30 between the first and second optical fibers 10, 20 by using an infrared-ray radiation thermometer at the time of heating with the micro torch. After the completion of the heating step, the inventors measured the splice loss at the fused point 30.

FIG. 9 is a table listing the surface temperature and splice loss at each part concerning sample Nos. 1 to 8 corresponding to the optical fiber device according to the third embodiment. Successively from the left side, the table of FIG. 9 shows sample No., the temperature at the fused point 30 during heating, the temperature at the position where the distance L=2 mm in the first optical fiber 10 during heating, the temperature at the position where the distance L=2 mm in the second optical fiber 20 during heating, the difference between the highest and lowest temperatures in a region having a length of 4 mm centered at the fused point 30 during heating, and the splice loss at the fused point 30 after the completion of the heating step. As can be seen from FIG. 9, the splice loss is 0.2 dB or less in general and thus is low if the difference between the highest and lowest temperatures in the region having a length of 4 mm centered at the fused point 30 during heating is 100° C. or less.

The optical fiber device according to a fourth embodiment comprises first and second optical fibers 10, 20 in which the difference between mode field diameters $D_{10}$, $D_{20}$ before fusion-splicing is 2 μm or less, i.e., $0 \leq D_{10}-D_{20} \leq 2$ μm. After the first and second optical fibers 10, 20 are fused to each other, a predetermined region including the fused point 30 between the first and second optical fibers 10, 20 is heated with a micro torch (see FIG. 6A), whereby the optical fiber device according to the fourth embodiment is obtained. A propane gas and an oxygen gas are supplied to the micro torch. The inventors determined a temperature distribution in the vicinity of the fused point 30 between the first and second optical fibers 10, 20 by using an infrared-ray radiation thermometer at the time of heating with the micro torch. After the completion of the heating step, the inventors measured the splice loss at the fused point 30.

FIG. 10 is a table listing the surface temperature and splice loss at each part concerning sample Nos. 1 to 8 corresponding to the optical fiber device according to the fourth embodiment. Successively from the left side, the table of FIG. 10 shows sample No., the temperature at the fused point 30 during heating, the temperature at the position where the distance L=1 mm in the first optical fiber 10 during heating, the temperature at the position where the distance L=1 mm in the second optical fiber 20 during heating, the difference between the highest and lowest temperatures in a region having a length of 2 mm centered at the fused point 30 during heating, and the splice loss at the fused point 30 after the completion of the heating step. As can be seen from FIG. 10, the splice loss is suppressed to 0.2 dB or less in general if the difference between the highest and lowest temperatures in the region having a length of 2 mm centered at the fused point 30 during heating is 100° C. or less.

The optical fiber device according to a fifth embodiment comprises first and second optical fibers 10, 20 in which the difference between mode field diameters $D_{10}$, $D_{20}$ before fusion-splicing is 2 μm or greater, i.e., $D_{10}-D_{20} 2$ μm. After the first and second optical fibers 10, 20 are fused to each other, a predetermined region including the fused point 30 between the first and second optical fibers 10, 20 is heated with a micro torch (see FIG. 5A), whereby the optical fiber device according to the fifth embodiment is obtained. A propane gas and an oxygen gas are supplied to the micro torch. In the fifth embodiment, while variously changing the relative position of the micro torch with respect to the fused point 30 along the optical axis direction of the first and second optical fibers 10, 20, the inventors measured the temperature distribution of the first and second optical fibers 10, 20 by using an infrared-ray radiation thermometer at the time of heating with the micro torch, thereby determining the position (the distance L from the fused point 30) yielding the highest temperature, the heating temperature at the fused point 30, and the heating temperature at the position where the distance L=1 mm from the fused point 30. After the completion of the heating step, the inventors measured the splice loss at the fused point 30.

FIG. 11 is a table listing the surface temperature and splice loss at each part concerning sample Nos. 1 to 13 corresponding to the optical fiber device according to the fifth embodiment. Successively from the left side, the table of FIG. 11 shows sample No., the position yielding the highest heating temperature (where negative values indicate that the position yielding the highest heating temperature is located on the second optical fiber 20 side, whereas positive values indicate that the position yielding the highest heating temperature is located on the first optical fiber 10 side), the heating temperature at the fused point 30, the heating temperature at the position where the distance L=1 mm from the fused point 30, and the splice loss at the fused point 30 after the completion of the heating step. As can be seen from FIG. 11, the splice loss is suppressed to 0.2 dB or less in general if the highest temperature is attained at a position where the distance L from the fused point 30 is 1.0 mm or less.

The optical fiber device according to a sixth embodiment comprises first and second optical fibers 10, 20 in which the difference between mode field diameters $D_{10}$, $D_{20}$ before fusion-splicing is 2 μm or less, i.e., $0 \leq D_{10}-D_{20} \leq 2$ μm. After the first and second optical fibers 10, 20 are fused to each other, a predetermined region including the fused point 30 between the first and second optical fibers 10, 20 is heated with a micro torch (see FIG. 6A), whereby the optical fiber device according to the sixth embodiment is obtained. A propane gas and an oxygen gas are supplied to the micro torch. While variously changing the relative position of the micro torch with respect to the fused point 30 along the optical axis direction of the first and second optical fibers 10, 20, the inventors measured the temperature distribution of the first and second optical fibers 10, 20 by using an infrared-ray radiation thermometer at the time of heating with the micro torch, thereby determining the position (the distance L from the fused point 30) yielding the highest temperature, the heating temperature at the fused point 30, and the heating temperature at the position where the distance L=1 mm from the fused point 30. After the completion of the heating step, the inventors measured the splice loss at the fused point 30.

FIG. 12 is a table listing the surface temperature and splice loss at each part concerning sample Nos. 1 to 13 corresponding to the optical fiber device according to the sixth embodiment. Successively from the left side, the table of FIG. 12 shows sample No., the position yielding the highest heating temperature (where negative values indicate that the position yielding the highest heating temperature is located on the second optical fiber 20 side, whereas positive values indicate that the position yielding the highest heating temperature is located on the first optical fiber 10 side), the heating temperature at the fused point 30, the heating temperature at the position where the distance L=1 mm from the fused point 30, and the splice loss at the fused point 30 after the completion of the heating step. As can be seen from FIG. 12, the splice loss is suppressed to 0.2 dB or less in general if the highest temperature is attained at a position where the distance L from the fused point is 0.5 mm or less.

The optical fiber device according to a seventh embodiment comprises first and second optical fibers 10, 20 in which the difference between mode field diameters $D_{10}$, $D_{20}$ before fusion-splicing is 2 μm or greater, i.e., $D_{10}-D_{20} \geq 2$ μm. After the first and second optical fibers 10, 20 are fused to each other, a predetermined region including the fused point 30 between the first and second optical fibers 10, 20 is heated with an electric heater (see FIG. 5A), whereby the optical fiber device according to the seventh embodiment is obtained. In the seventh embodiment, samples were manufactured by any of a heating step in which the vicinity of the fused point 30 was heated such that the difference between the highest and lowest temperatures in a region having a length of 4 mm centered at the fused point 30 became 100° C. or less as in the third embodiment and a heating step in which the vicinity of the fused point 30 was heated such that the highest temperature was attained at a position separated by 1 mm or less from the fused point 30 as in the fifth embodiment.

FIG. 13 is a table listing the surface temperature and splice loss of each part concerning sample Nos. 1 to 4 for which the heating step was carried out as in the third embodiment as the optical fiber device according to the seventh embodiment. FIG. 14 is a table listing the surface temperature and splice loss of each part concerning sample Nos. 5 to 17 for which the heating step was carried out as in the fifth embodiment as the optical fiber device according to the seventh embodiment.

As can be seen from FIGS. 13 and 14, the splice loss is suppressed to 0.2 dB or less in general if the difference between the highest and lowest temperatures in the region having a length of 4 mm centered at the fused point 30 during heating is 100° C. or less (sample Nos. 1 to 4) in the case where the electric heater is utilized as in the case utilizing the micro torch. Also, the splice loss is suppressed to 0.2 dB or less in general if the highest temperature is attained at a position where the distance L from the fused point 30 is 1.0 mm or less (sample Nos. 5 to 17).

In accordance with the present invention, as in the foregoing, the respective ratios of change in the mode field diameters $D_1(L)$ and $D_2(L)$ of the first and second optical fibers after fusion-splicing are set appropriately according to the difference between the mode field diameters $D_{10}$, $D_{20}$ (minimum values) of the first and second optical fibers before fusion-splicing, whereby the splice loss at the fused point between the first and second optical fibers can effectively be reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber device comprising a first optical fiber and a second optical fiber having one end fusion-spliced to one end of said first optical fiber;

wherein said first optical fiber has a first mode field diameter $D_1(L)$ at a position separated by a distance L from a fused point between said first and second optical fibers;

wherein said second optical fiber has a second mode field diameter $D_2(L)$ at a position separated by said distance L from said fused point between said first and second optical fibers;

wherein the minimum value $D_{20}$ of said second mode field diameter is different from the minimum value $D_{10}$ of said first mode field diameter; and wherein each of the maximum value of the ratio of change in said first mode field diameter $(D_1(L_1)-D_1(L_2))/(L_2-$ $L_1$) between two points respectively separated by distances $L_1$ and $L_2$ (>$L_1$) toward said first optical fiber from said fused point between said first and second optical fibers and the maximum value of the ratio of change in said second mode field diameter ($D_2(L_1) - D_2(L_2))/(L_2 - L_1)$ between two points respectively separated by said distances $L_1$ and $L_2$ (>$L_1$) toward said second optical fiber from said fused point between said first and second optical fibers is 4.0 $\mu$m/mm or less.

2. An optical fiber device according to claim 1, wherein said minimum value $D_{10}$ of said first mode field diameter and said minimum value $D_{20}$ of said second mode field diameter have a difference of 2 $\mu$m or more therebetween.

3. An optical fiber device according to claim 2, wherein said optical fiber device satisfies the following conditions $$D_1(L) - D_{10} \leq 0.1 \ \mu m \ (\text{where } L \geq 5 \ \text{mm}),$$

$$D_2(L) - D_{20} \leq 0.1 \ \mu m \ (\text{where } L \geq 5 \ \text{mm}),$$

$$(D_1(0) - D_1(2))/2 \leq 1.5 \ \mu m/mm,$$

$$(D_2(0) - D_2(2))/2 \leq 1.5 \ \mu m/mm,$$

$$(D_1(0) - D_1(3))/3 \leq 2.5 \ \mu m/mm, \text{ and}$$

$$(D_2(0) - D_2(3))/3 \leq 2.5 \ \mu m/mm.$$

4. An optical fiber device according to claim 2, wherein said optical fiber device satisfies the following conditions $$D_1(L) - D_{10} \leq 0.1 \ \mu m \ (\text{where } L \geq 5 \ \text{mm}),$$

$$D_2(L) - D_{20} \leq 0.1 \ \mu m \ (\text{where } L \geq 5 \ \text{mm}),$$

$$(D_1(0) - D_1(2))/2 \leq 1.0 \ \mu m/mm, \text{ and}$$

$$(D_2(0) - D_2(2))/2 \leq 1.0 \ \mu m/mm.$$

5. An optical fiber device according to claim 2, wherein said optical fiber device satisfies the following conditions $$D_1(L) - D_{10} \geq 0.1 \ \mu m \ (\text{where } L \leq 3 \ \text{mm}), \text{ and}$$

$$D_1(L) - D_{10} \leq 0.1 \ \mu m \ (\text{where } L \geq 5 \ \text{mm}).$$

6. An optical fiber device according to claim 1, wherein said minimum value $D_{10}$ of said first mode field diameter and said minimum value $D_{20}$ of said second mode field diameter have a difference of 2 $\mu$m or less therebetween.

7. An optical fiber device according to claim 6, wherein said optical fiber device satisfies the following conditions:

$$D_1(L) - D_{10} \leq 0.1 \ \mu m \ (\text{where } L \geq 3 \ \text{mm}),$$

$$D_2(L) - D_{20} \leq 0.1 \ \mu m \ (\text{where } L \geq 3 \ \text{mm}),$$

$$(D_1(0) - D_1(1))/1 \leq 1.5 \ \mu m/mm, \text{ and}$$

$$(D_2(0) - D_2(1))/1 \leq 1.5 \ \mu m/mm.$$

8. An optical fiber device according to claim 6, wherein said optical fiber device satisfies the following conditions:

$$D_1(L) - D_{10} \geq 0.1 \ \mu m \ (\text{where } L \leq 1.5 \ \text{mm}), \text{ and}$$

$$D_1(L) - D_{10} \leq 0.1 \ \mu m \ (\text{where } L \geq 3.0 \ \text{mm}).$$

9. An optical fiber device according to claim 1, wherein one of said minimum value $D_{10}$ of said first mode field diameter and said minimum value $D_{20}$ of said second mode field diameter is 2 $\mu$m or more but 7 $\mu$m or less.

10. An optical fiber device according to claim 1, wherein one of said minimum value $D_{10}$ of said first mode field diameter and said minimum value $D_{20}$ of said second mode field diameter is 10 $\mu$m or more but 14 $\mu$m or less.

11. A method of making the optical fiber device according to claim 1, said method comprising the steps of:

preparing first and second optical fibers yielding respective mode field diameters with a difference of 2 $\mu$m or more therebetween;

fusion-splicing one end face of said first optical fiber and one end face of said second optical fiber to each other; and partly heating said first and second optical fibers, after said first and second optical fibers are fusion-spliced, such that the highest and lowest temperatures in a region having a length of 4 mm centered at a fused point between said first and second optical fibers yield a difference of 100° C. or less therebetween.

12. A method according to claim 11, wherein said first and second optical fibers are partly heated, after said first and second optical fibers are fusion-spliced, such that the highest temperature is attained at a position separated by 1.0 mm or less from said fused point between said first and second optical fibers toward at least one of said first and second optical fibers.

13. A method according to claim 11, wherein said region including said fused point between said first and second optical fibers is heated with a flame formed by supplying a flammable gas and an oxygen gas to a micro torch.

14. A method according to claim 11, wherein said region including said fused point between said first and second optical fibers is heated with an electric heater.

15. A method of making the optical fiber device according to claim 1, said method comprising the steps of:

preparing first and second optical fibers yielding respective mode field diameters with a difference of 2 $\mu$m or less therebetween;

fusion-splicing one end face of said first optical fiber and one end face of said second optical fiber to each other; and partly heating said first and second optical fibers, after said first and second optical fibers are fusion-spliced, such that the highest and lowest temperatures in a region having a length of 2 mm centered at a fused point between said first and second optical fibers yield a difference of 100° C. or less therebetween.

16. A method according to claim 15, wherein said first and second optical fibers are partly heated, after said first and second optical fibers are fusion-spliced, such that the highest temperature is attained at a position separated by 0.5 mm or less from said fused point between said first and second optical fibers toward at least one of said first and second optical fibers.

17. A method according to claim 15, wherein said region including said fused point between said first and second optical fibers is heated with a flame formed by supplying a flammable gas and an oxygen gas to a micro torch.

18. A method according to claim 15, wherein said region including said fused point between said first and second optical fibers is heated with an electric heater.

* * * * *